US009909937B2

United States Patent
Dangson et al.

(10) Patent No.: US 9,909,937 B2
(45) Date of Patent: Mar. 6, 2018

(54) METHOD OF IDENTIFYING AND REDUCING LATERAL FORCE OF A COIL SPRING

(71) Applicant: Indian Head Industries, Inc., Charlotte, NC (US)

(72) Inventors: Henry Dangson, Matthews, NC (US); Casey Zella, Huntersville, NC (US); Steve Lepard, Concord, NC (US); Robin Jenkins, Maryville, TN (US)

(73) Assignee: INDIAN HEAD INDUSTRIES, INC., Charlotte, NC (US)

( * ) Notice: Subject to any disclaimer, the term of this patent is extended or adjusted under 35 U.S.C. 154(b) by 223 days.

(21) Appl. No.: 14/675,825

(22) Filed: Apr. 1, 2015

(65) Prior Publication Data

US 2015/0276511 A1    Oct. 1, 2015

Related U.S. Application Data

(60) Provisional application No. 61/973,454, filed on Apr. 1, 2014.

(51) Int. Cl.
*G01L 1/04* (2006.01)

(52) U.S. Cl.
CPC ......... *G01L 1/042* (2013.01); *Y10T 29/49609* (2015.01)

(58) Field of Classification Search
CPC ... G01N 2203/0292; G01N 2203/0021; G01N 2203/0019; G01N 3/08; B60G 17/021; G01L 1/042
See application file for complete search history.

(56) References Cited

U.S. PATENT DOCUMENTS

| | | | | |
|---|---|---|---|---|
| 2,291,561 A * | 7/1942 | Reiss | ............ | G01N 3/00 73/161 |
| 2,639,613 A * | 5/1953 | Richmond | ............ | G01N 3/00 177/208 |
| 3,640,129 A * | 2/1972 | Bandimere | ............ | G01N 3/00 73/114.79 |
| 3,675,479 A * | 7/1972 | Carlson | ............ | G01N 3/00 73/161 |
| 3,834,228 A * | 9/1974 | Wachholz | ............ | G01N 3/00 73/161 |
| 4,157,033 A * | 6/1979 | Shereda | ............ | G01N 3/00 73/161 |
| 4,517,848 A * | 5/1985 | Faure | ............ | F16F 1/041 73/711 |
| 4,641,521 A * | 2/1987 | Lawrence | ............ | G01M 13/00 73/161 |
| 5,090,249 A * | 2/1992 | Bielewicz | ............ | G01N 3/08 73/822 |
| 5,832,774 A * | 11/1998 | Smith | ............ | G01N 3/00 73/161 |

(Continued)

*Primary Examiner* — Freddie Kirkland, III
(74) *Attorney, Agent, or Firm* — Warner Norcross & Judd LLP

(57) ABSTRACT

A method of monitoring lateral force of a coil spring having a body and opposing end coils is disclosed. A fixture includes a base defining a planar surface with a shaft that extends from said planar surface at a normal angle to said planar surface. An axis defined by the coil spring is aligned with the shaft. Angular displacement from the shaft of an end coil is measured, and the angular displacement is correlated with a lateral force value.

8 Claims, 3 Drawing Sheets

(56) References Cited

U.S. PATENT DOCUMENTS

| | | | | |
|---|---|---|---|---|
| 6,128,950 A | * | 10/2000 | Hoagland | G01N 3/08 73/161 |
| 6,779,564 B2 | * | 8/2004 | Hasegawa | B60G 15/063 140/89 |
| 7,069,778 B1 | * | 7/2006 | Strehler | G01N 3/00 33/535 |
| 8,151,638 B2 | * | 4/2012 | Erlenkeuser | G01N 3/00 73/161 |
| 2003/0116219 A1 | * | 6/2003 | Hasegawa | B60G 15/063 140/89 |
| 2010/0139359 A1 | * | 6/2010 | Erlenkeuser | G01N 3/00 73/1.15 |

\* cited by examiner

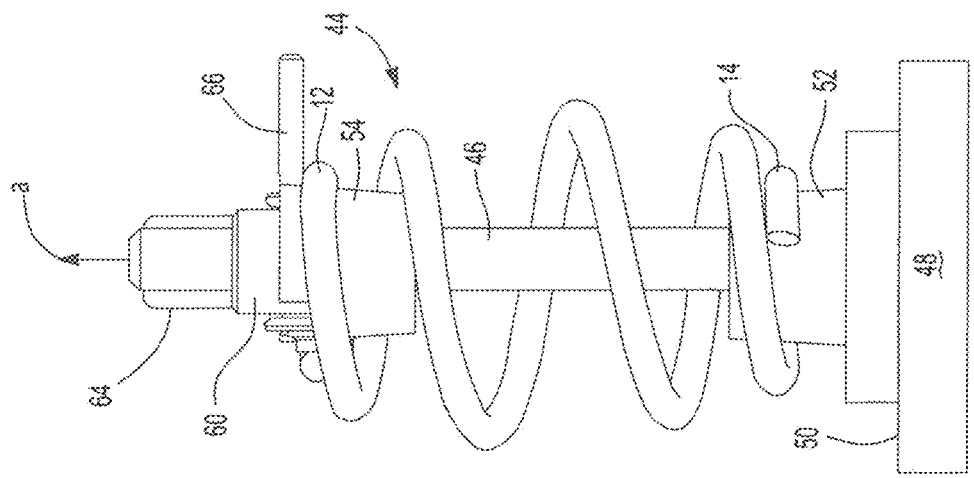
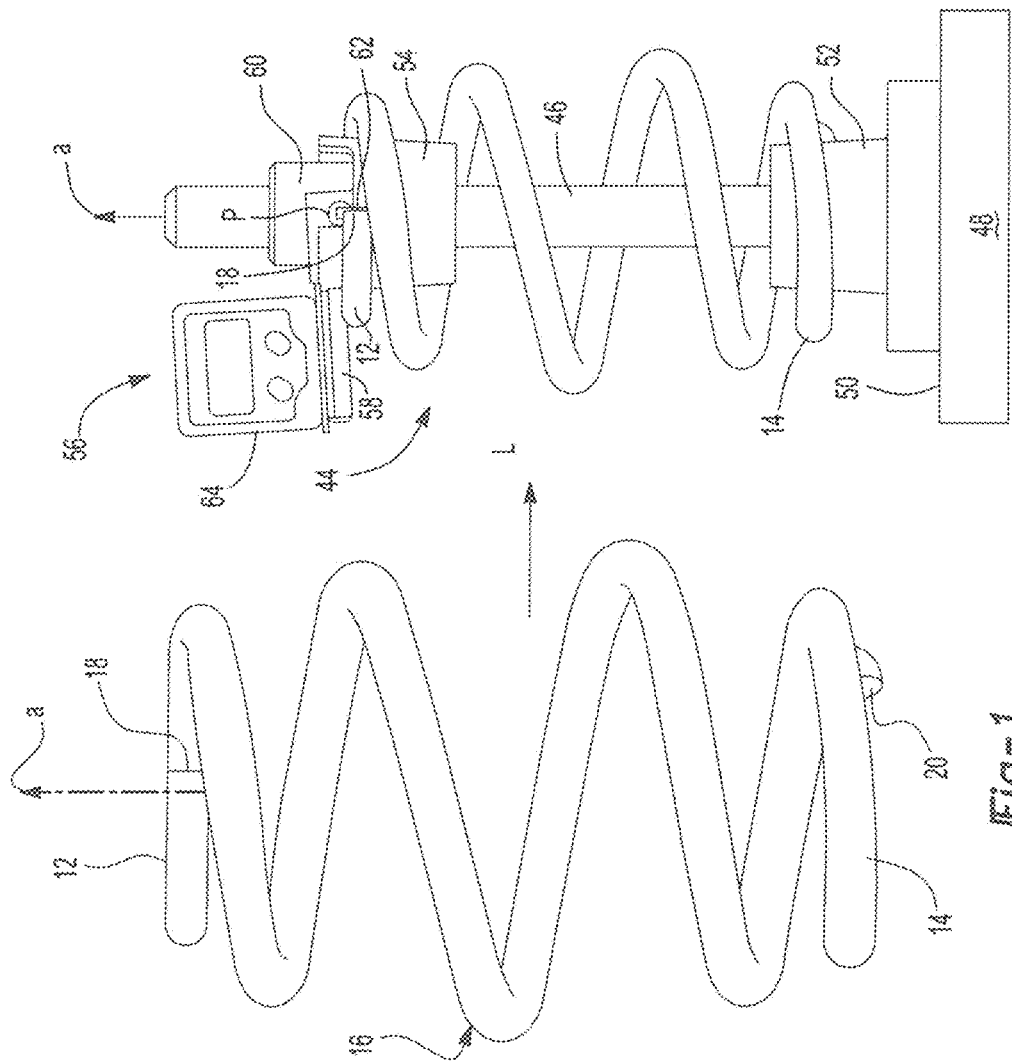

METHOD OF IDENTIFYING AND REDUCING LATERAL FORCE OF A COIL SPRING

PRIOR APPLICATIONS

This application claims priority to U.S. Provisional Patent Application No. 61/973,454 filed on Apr. 1, 2014.

TECHNICAL FIELD

The present invention relates generally toward coiled compression springs. More specifically, the present invention relates toward a method of optimizing performance of a coiled compression spring.

BACKGROUND

Compression springs have been used for many years in various capacities. For example, coiled compression springs are used in suspension systems, brake actuators, and various other mechanical devices where axial force generated through the compression of the spring is used. Generally, the desired force, or K-value of a spring is used to affect location and movement of the mechanical device. Hooke's Law is a principle of physics that defines the actual force of a compressed spring based upon the distance a spring is compressed. The axial force is a desired result of compressing a coiled spring. However, a phenomenon known as lateral force, has been an historic problem that heretofore has not been solved.

Lateral force is the force generated by a compressed spring that is lateral to the axial force along a spring axis, which is defined by a body of a coiled compression spring. Lateral force is known to cause premature failures in brake actuators and other mechanical devices that make use of the axial force generated by the compressed spring. It has been an unknown phenomenon as to what mechanical feature of the spring has caused unwanted lateral force. Therefore, no solution to the lateral force phenomenon has, to date, been developed. Therefore, it would be desirable to identify a cause of lateral force of a coiled compression spring and solve the problem of lateral force on mechanical devices.

SUMMARY

The method of monitoring lateral force of a coil spring having a body and opposing end coils is disclosed. A fixture having a base that defines a planar surface with a shaft extends from the planar surface at a normal angle to the planar surface. An axis defined by the coil spring is aligned with the shaft. Angular displacement from the shaft of one of the end coils is measured and correlated with a lateral force value of the spring.

It has been determined that the phenomenon known as lateral force generated during compression of a coil spring is the result of angular displacement of an end coil of the coil spring from the axis defined by the coil spring. The cause of lateral force generated by a coil spring was previously unknown. Therefore, it was determined that maintaining the angular displacement of at least one of the end coils of a coil spring would control the amount of lateral force generated by compression of the coil spring. For example, maintaining an angular displacement of at least one of the opposing end coils from the spring axis of between about −1.5° and 2.5° from a plane that is normal to the spring axis controls the lateral load generated by the coil spring below a predetermined threshold believed to substantially eliminate damage caused to mechanical devices from lateral force. As such, a desirable manufacturing process has been developed that solves the historical lateral force problem of compression coil springs.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 shows one embodiment of a coil compression spring that is subject of the present invention;

FIG. 3A shows a front view of an apparatus of the present invention;

FIG. 3B shows a side view of the apparatus of the present invention;

DETAILED DESCRIPTION

Figure 2A:
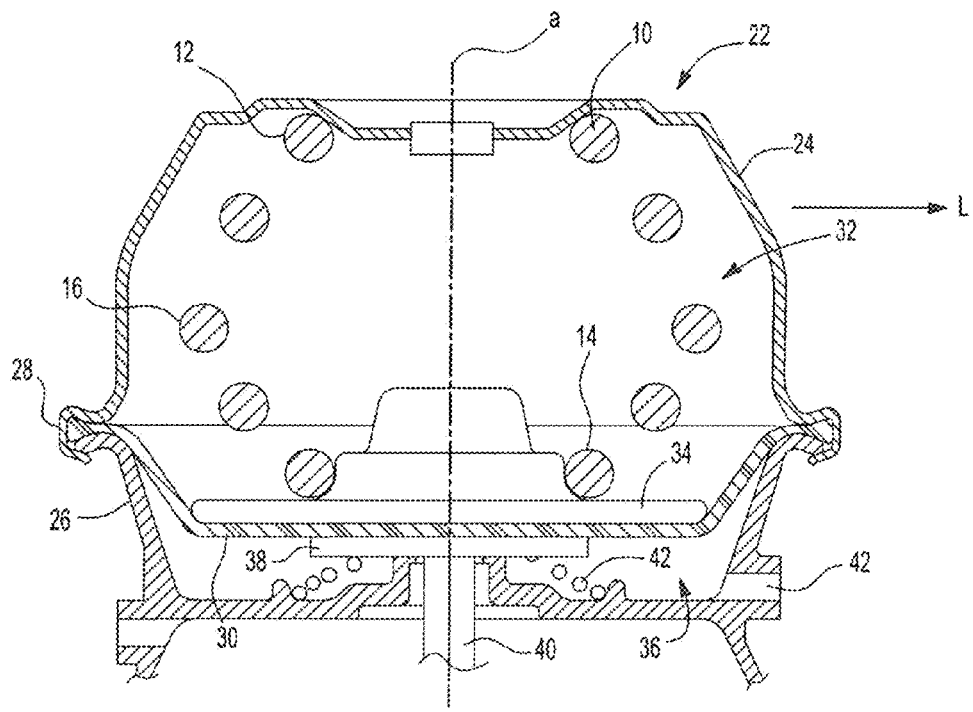
FIGS. 2A and 2B show cross-sectional views of a coil compression spring in use in brake actuators.

Referring to FIG. 1, an exemplary spring that is subject to the present invention is generally sown at 10. The spring 10 is of the coiled, compression-type where stored energy as the result of compression is generated along spring axis a. The spring 10 includes a first end coil 12 and an opposing second end coil 14. A body 16 is disposed between the first end coil 12 and the second end coil 14. While the spring 10 represented in FIG. 1 is of the barrel-type having a body 16 with a greater diameter than the end coils 12, 14, it should be understood by those of ordinary skill in the art other coil springs are subject to the present invention including, for example, tubular springs where the diameter of the entire expanse of the spring is generally constant.

The first end coil 12 is identified at a first distal end 18 and extends around the spring axis about 180°. Likewise, the second end coil 14 extends from a second distal end 20 to about 180° around the spring axis a from the second distal end 20.

As set forth above, the primary function of the coil spring 10 is to store energy upon compression that is translated along spring axis a. However, lateral force L has historically been an uncontrolled phenomenon of the coil spring 10. Lateral force L generated by a coil spring 10 is known to cause structural defects in a related component such as, for example, brake actuators, suspension systems, and other mechanical devices making use of spring force K in the axial direction.

Figure 2B:
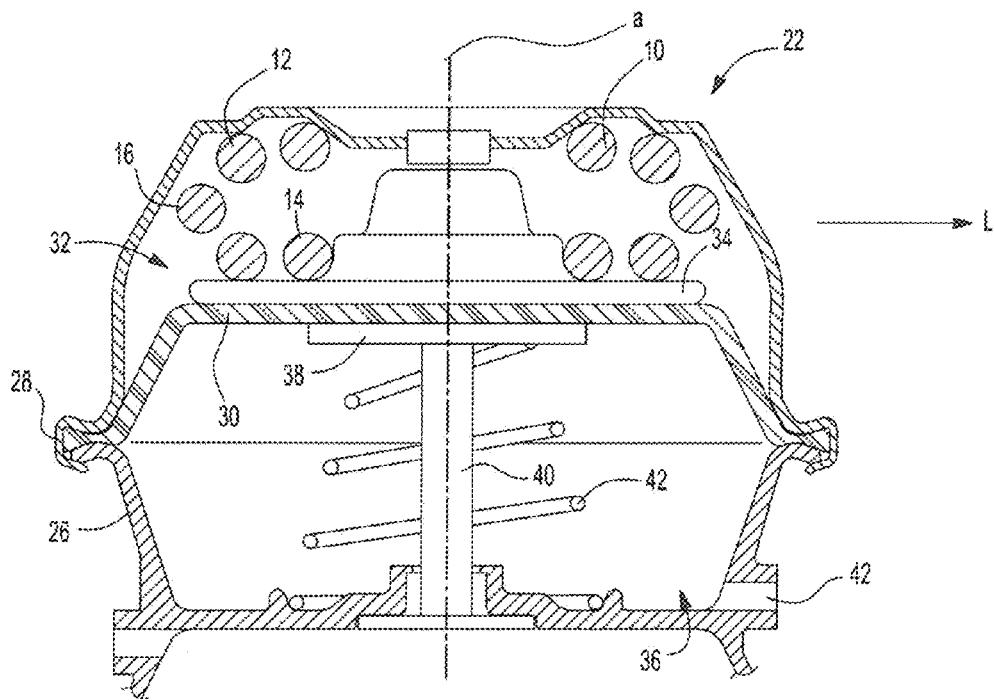

One such example will now be described as shown in FIGS. 2A and 2B. A relevant portion of a brake actuator is generally shown at 22. The coil spring 10 is disposed within power spring housing 24. The housing 24 is secured to a flange case 26 by way of a crimp 28. A diaphragm 30 is secured within the crimp 28 between the power spring housing 24 and the flange case 26. A power spring chamber 32 is defined between the diaphragm 30 and the power spring housing 24. The coil spring 10 is shown in an expanded state in FIG. 2A and a compressed state having stored energy in FIG. 2B.

A spring piston 34 is disposed between the diaphragm 30 and the coil spring 10 to guide the coil spring 10 as it is compressed and expanded and provides structural support to the spring 10. A pneumatic chamber 36 is depressurized as shown in FIG. 2A allowing the coil spring 10 to expand forcing plate 38 and piston rod 40 to actuate in a known manner. The pneumatic chamber 36 is pressurized at pneumatic port 42 with sufficient pneumatic pressure to compress the coil spring 10 in a known manner as shown in FIG. 2B. A return spring 42 causes the plate 38 and piston rod 40 to extend toward the spring chamber 32 to retract the plate 38 and piston rod 40 when the pneumatic chamber 36 is pressurized.

As set forth above, the coil spring 10 not only exerts force along the spring axis a, a coil spring is known to exert a lateral force L known to cause damage by forcing the spring piston 34 to actuate in an inconsistent angle damaging the diaphragm 30, in addition to other defects. Therefore, the present invention endeavours to reduce or eliminate lateral force associated with the coil spring 10 to reduce or eliminate defects caused by unwanted lateral force.

Referring now to FIGS. 3A and 3B, applicant has developed a unique apparatus to identify that which has been determined to cause the lateral force in a coil spring. The inventors of the present application have determined that angular displacement of one of the end coils 12, 14 from a plane perpendicular to the spring axis a is the cause of lateral force generated by the coil spring 10. In addition to this discovery, an apparatus for measuring this angular displacement has been invented and is best represented in FIGS. 3A and 3B generally shown at 44.

A shaft 46 extends from a base 48 that defines a planer surface 50. The shaft 46 extends at a normal or perpendicular angle from a planer surface 50 of the base 48. A conical member 52 is received by the shaft 46 and is disposed upon the planer surface 50 of the base 48 so that the conical member 52 is co-axial with the shaft 46 having its narrower portion directed upwardly. A second conical member 54 is inverted relative to the first conical member 52 and supports a measurement assembly 56.

Figure 4:
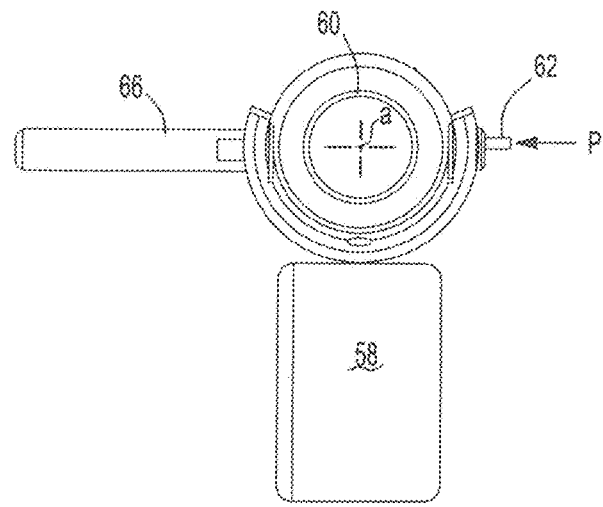
FIG. 4 shows a plan view of a measurement assembly.

The measurement assembly 56 includes a pivot arm 58 that is pivotally secured to a tubular member 60 at pivot point P as best seen in FIG. 4. The tubular member 60 is aligned concentrically with second conical member 54 so that, when received by the shaft 46 the second conical member 54 is co-axial with the shaft. A stop 62 is positioned at the pivot point P the purpose of which will be described further herein below. An angle gauge 64 is disposed upon the arm 58 in a manner that a zero angle is measured relative to a plane that is perpendicular to the shaft 46. The angle gauge 64 is contemplated to be a Wixey Visual Angle Gauge, part number WR300 or equivalent.

When measuring angular displacement of the end coils 12, 14, the coil spring 10 is placed onto the apparatus 44 so that the second end coil 14 engages the first conical member 52. Subsequently, the second conical member 54 is positioned into the first end coil 12, thereby aligning the spring axis a with the shaft 46 at a same axis defined by the first and second conical members 52, 54. The measurement assembly 56 is placed on shaft 46, thereby aligning the measurement assembly 56 with spring axis a. A reference arm 66 which is secured to tubular member 60 along axis which intersects pivot point P will make contact with first end coil 12. The reference arm 66 is used to rotate the measurement assembly 56 until the first distal end 18 of the first end coil 12 abuts the stop 62. In this manner, the arm 58, and therefore the angle gauge 64 are disposed at a location on the end coil 12 that is 90° from the first distal end 18. At this point, the arm 58 is allowed to pivot around to the point P so that the angle gauge 64 measures the angular relationship of the end coil 12 relative to a plane that is normal to the axis a defined by the coil spring 10. In a similar manner, the coil spring 10 is inverted and the angle of the second end coil 14 is measured by the angle gauge 64.

Figure 5:
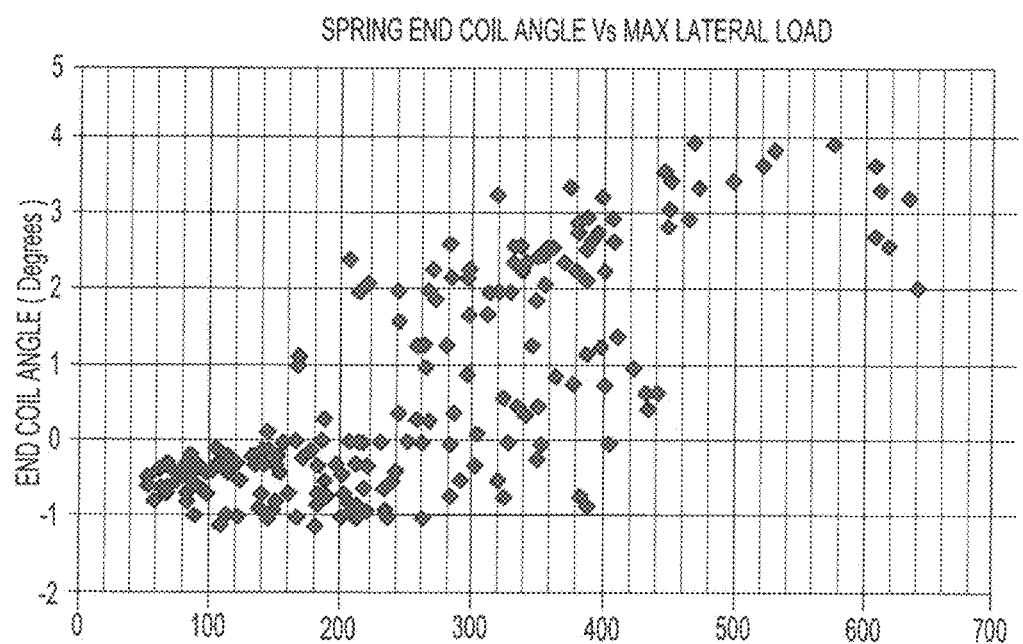
FIG. 5 shows chart indicating statistical test data.

Previously, the lateral force of compression springs were measured resulting in upwards of a 40% of coil springs 10 having a lateral force threshold higher than a desirable value. Some applications, it's proved to be a lateral force of about 400 Newtons. Therefore, applicant set upon optimizing an end coil angle relative to a desired target lateral load. Referring to FIG. 5, it was determined that an optimized angular displacement of between about −1.5° and +2.5° from a plane that is normal to the spring axis A. It was further determined that a more optimal range is between −1° and 0° from the plane that is horizontal to the spring axis a. Still further, a target value of about −1° from a plane horizontal to the spring axis a is a target value for minimal lateral force.

Various steps were made to tighten tolerances during spring manufacturing, the use of pre-tempered wire prior to folding the coil proved most beneficial in establishing a consistent angular displacement between about −1.5° and 2.5° from the plane that is normal to the spring axis a. For an SAE J2318 spring or the like, a target ratio of axial force to lateral force measured at an extended disposition is between about 67 and 13 to 1. A target ratio is about 53 to 1. A spring that exceeds SAE J2318 standards by about 20% includes an axial force to lateral force measured at an extended position between about 80 and 60 to 1, with a target ratio of about 64 to 1.

The invention has been described in an illustrative manner, and is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise and is specifically described, and still be within the scope of the present application.

What is claimed is:

1. A method of monitoring lateral force of a coil spring having a body disposed between an opposing first end coil and second end coil comprising the steps of:
   providing a fixture having a base defining a planar surface and a shaft extending from said planar surface at an angle that is normal to said planar surface;
   providing a pivot arm extending laterally of said shaft for reposing upon said first end coil;
   aligning an axis defined by the coil spring with said shaft; and
   measuring angular displacement of the first end coil from said axis defined by said coil spring by measuring angular displacement of said pivot arm from said axis and correlating the angular displacement with a lateral force value thereby determining if the lateral force correlated from the angular displacement of the coil spring exceeds a predetermined value.

2. The method set forth in claim 1, wherein said step of measuring angular displacement of said first end coil from said axis defined by said coil spring is further defined by measuring displacement at a location about ninety degrees from a distal end of the end coil.

3. The method set forth in claim 1, wherein said step of measuring angular displacement of said pivot arm from said axis is further defined by measuring a cumulative angular displacement of said pivot arm from said axis of both said first and said second end coils.

4. The method set forth in claim 1, further defined by providing opposing retainers, each retainer being axially aligned with said shaft for securing the opposing end coils of the spring thereby aligning the axis defined by the coil spring with said shaft.

5. The method set forth in claim 4, wherein said step of providing opposing retainers is further defined by providing opposing conical members oriented to receive the end coils of the coil spring.

6. The method set forth in claim 1, wherein said step of measuring angular displacement of said pivot arm from said axis is further defined by providing an angle gauge and locating the angle gauge on said pivot arm at a location about ninety degrees around said axis from a distal end of said first end coil.

7. The method set forth in claim 6, wherein said step of measuring angular displacement of said pivot arm from said axis is further defined by pivoting a stop disposed upon said pivot arm to a location on said shaft defined by the distal end of the end coil.

8. The method set forth in claim 7, further including a step of positioning a reference arm to a location on the end coil being about 180° from a distal end of said end coil.

* * * * *